(12) United States Patent
Lagrange et al.

(10) Patent No.: US 7,167,465 B2
(45) Date of Patent: Jan. 23, 2007

(54) METHOD FOR ATM FLOW COMMUNICATION, AND RELAY FOR IMPLEMENTING THE METHOD

(75) Inventors: Patrick Lagrange, Montrouge (FR); Pierre-Emmanuel Calmel, Versailles (FR); Valérie Fontanes, Suresnes (FR)

(73) Assignee: Nortel Networks Limited, St. Laurent (CA)

( * ) Notice: Subject to any disclaimer, the term of this patent is extended or adjusted under 35 U.S.C. 154(b) by 1057 days.

(21) Appl. No.: 10/195,225

(22) Filed: Jul. 15, 2002

(65) Prior Publication Data

US 2003/0026285 A1 Feb. 6, 2003

(30) Foreign Application Priority Data

Jul. 16, 2001 (FR) ................... 01 09465

(51) Int. Cl.
  *H04B 7/212* (2006.01)
  *H04L 12/64* (2006.01)
(52) U.S. Cl. .................. 370/347; 370/353; 370/442
(58) Field of Classification Search .......... 370/254, 370/255, 293, 310.1, 310.2, 315, 322, 324, 370/326, 328, 329, 336, 337, 345, 347, 348, 370/350, 352, 353, 442, 458, 468, 498, 503, 370/509, 514, 535, 537, 913, 915, 916
See application file for complete search history.

(56) References Cited

U.S. PATENT DOCUMENTS 5,610,951 A 3/1997 Higginson et al.

| 6,407,992 | B1* | 6/2002 | Pasternak et al. ........... 370/338 |
| 6,594,486 | B1* | 7/2003 | Rasanen .................. 455/422.1 |
| 6,650,649 | B1* | 11/2003 | Muhammad et al. ....... 370/402 |
| 6,795,437 | B1* | 9/2004 | Rasanen .................. 370/395.1 |
| 6,853,648 | B1* | 2/2005 | Krstanovski et al. ....... 370/465 |
| 6,920,156 | B1* | 7/2005 | Manchester et al. ........ 370/522 |
| 2002/0086667 | A1* | 7/2002 | Suvanen ..................... 455/422 |

FOREIGN PATENT DOCUMENTS

EP 1 111 827 6/2001

OTHER PUBLICATIONS

ATM Forum Technical Committee, ATM on Fractional E1/T1, AF-PHY-0130.00, Oct. 1999.

* cited by examiner

*Primary Examiner*—Doris H. To
*Assistant Examiner*—Ahmed Elallam
(74) *Attorney, Agent, or Firm*—Trop, Pruner & Hu, PC

(57) ABSTRACT

A time division multiplex link is used with successive frames each having a specified number of transmission timeslots. A first unit inserts ATM cells into a part of the timeslots which is allotted to the ATM flow intended for a second unit and other data into other timeslots allotted to the transport of at least one non-ATM flow intended for a third unit. The signals received are analyzed so as to search for synchronization with the cells of the ATM flow and to identify that part of the timeslots which is allotted to the ATM flow. This analysis comprises a synchronization test executed successively on subsets of timeslots within the frames until good synchronization is observed. The cells extracted from the timeslots of the identified part are then directed to the second unit, while the other data are directed to the third unit.

17 Claims, 3 Drawing Sheets

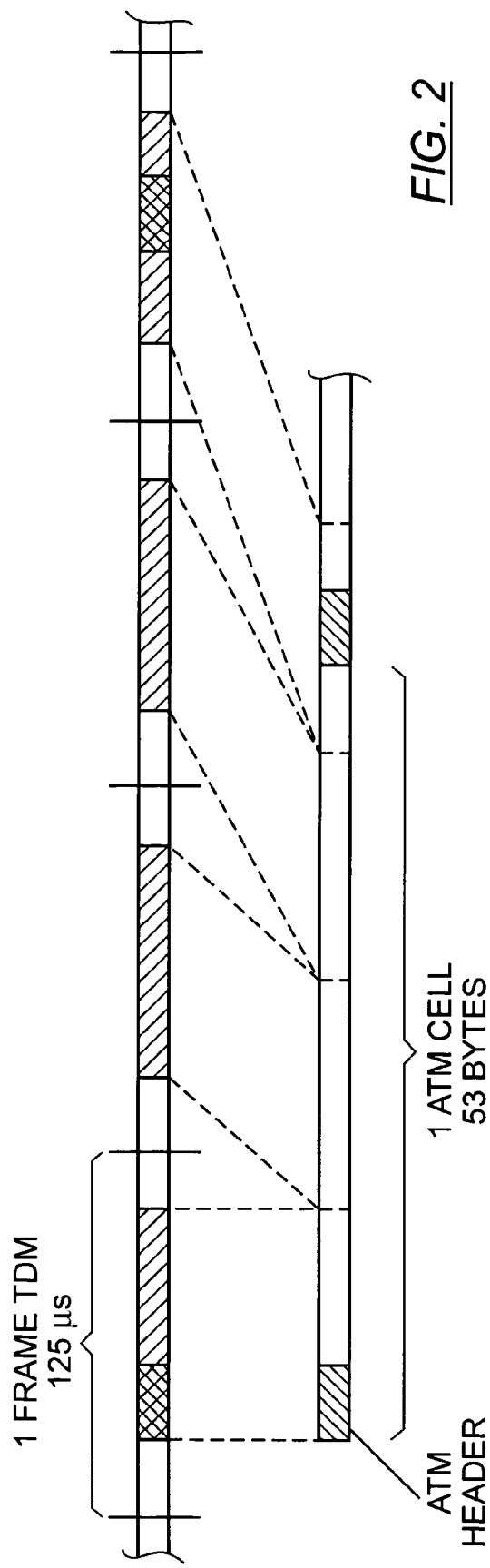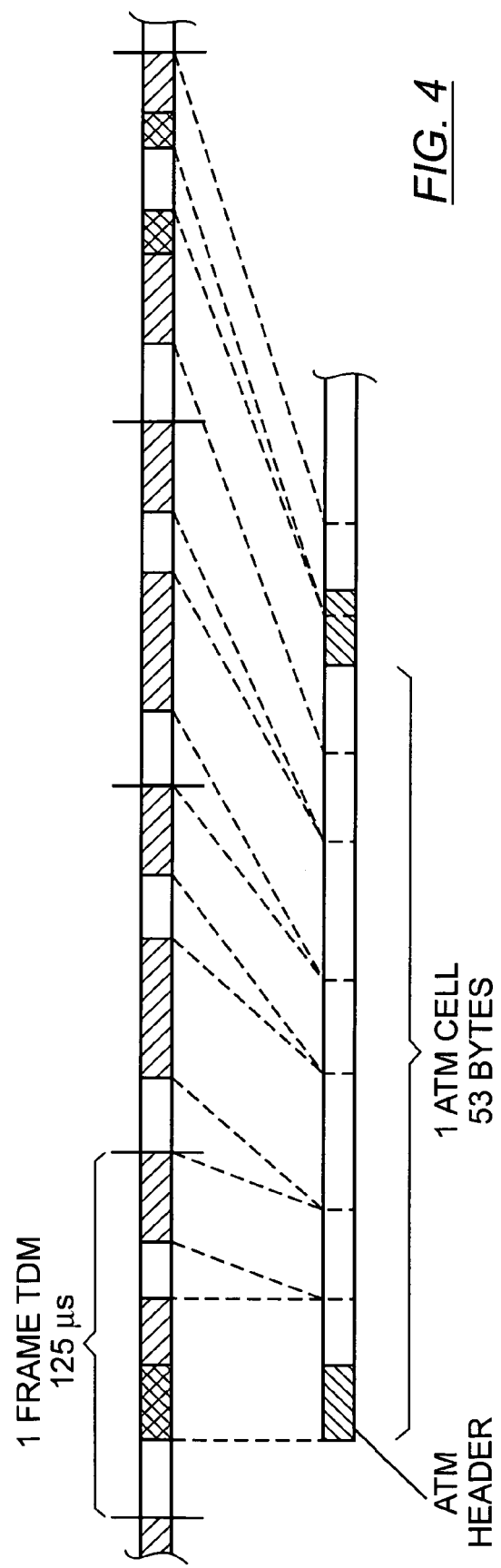

METHOD FOR ATM FLOW COMMUNICATION, AND RELAY FOR IMPLEMENTING THE METHOD

BACKGROUND OF THE INVENTION

The present invention relates to the transmission of heterogeneous flows on time division multiplex links. It applies in particular to the transmission of an ATM flow accompanied by one or more other data flows by way of transmission interfaces of the plesiochronous hierarchy of type DS1 or E1.

DS1 or E1 links group together 64-kbit/s elementary channels (DS0) by a principle of time division multiplexed (TDM) access. According to this principle, the transmission time on the link is divided into frames of 125 µs, themselves subdivided into K timeslots (TS) each assigned to the transmission of a data byte of a respective DS0 channel. In North America (DS1 links), the number K is equal to 24, so that the overall bit rate of the link is 1.544 Mbit/s. In Europe, the links are of E1 type at 2.048 Mbit/s with K=32 (in fact, only 30 of is 32 timeslots are usable for transferring useful traffic).

A TDM link can be used to transport ATM ("Asynchronous Transfer Mode") traffic. In ATM transmission, the data are chopped into packets of 53 bytes called cells. Each cell comprises a 5-byte header and 48 data bytes. The fifth byte of the header contains a redundancy check checksum (CRC) intended for increasing the reliability of transmission of the information of the header. The presence of this CRC byte further makes it possible, in a known manner, to detect the boundaries of the cells in the digital signal which carries them.

The way in which ATM cells are inserted on a TDM link is specified in recommendation AF-PHY-0130.00, "ATM on Fractional E1/T1", published in October 1999 by the Technical Committee of the ATM Forum. This insertion exhibits the following characteristics:

- the alignment of the bytes of the ATM cells complies with the alignment of the bytes on the E1 or DS1 link, i.e. the bytes of the ATM cells are found directly in the TSs of the frame;
- the TSs carrying the bytes of the ATM cells may or may not be consecutive on the E1 or DS1 link;
- the alignment of the cells is independent of the alignment of the K×64 kbit/s frames repeated every 125 µs.

The present invention envisages in particular network deployment scenarios in which ATM virtual circuits are borne on existing TDM links carrying traffic of another kind. Such a scenario is encountered during the migration of existing infrastructures to networks using ATM technology.

In particular, the third-generation cellular radio networks of the UMTS type ("Universal Mobile Telecommunication System") use ATM connections to transfer the data from and to the base stations deployed over the territory of coverage. These third-generation networks are set up on the basis of the existing infrastructure of second-generation networks of the GSM type ("Global System for Mobile communications") or the like, which use TDM links with the base stations. During the setting up of the third-generation service, these TDM links may be used also to transport the ATM flows intended for the new base stations.

In such a scenario, arrangements have to be made for separating the flow of ATM cells from the other flows carried by the TDM link. In general, this requires configuration of the various items of equipment involved, so that they know from which timeslots of the TDM frame they will have to extract the relevant information. Thus, the setting up of the item of equipment for which the ATM flow is intended requires specific configuring of its TDM interface so that it can receive and synchronize itself with the ATM cells.

It may be desirable to do away with these configuring operations ("plug & play" concept). This is especially beneficial in the aforesaid example of the deployment of a new cellular radio communication network, in which a fairly large number of new base stations have to be installed at various locations.

An object of the present invention is to fulfill the above need.

SUMMARY OF THE INVENTION

The invention thus proposes a method of communicating along a time division multiplex link on which digital signals are exchanged in the form of successive frames each having a specified number of transmission timeslots. A first unit inserts ATM cells into a part of the timeslots allotted to an ATM flow intended for a second unit, and other data into other timeslots allotted to the transport of at least one non-ATM flow intended for a third unit. In this method, the digital signals received in successive frames are analyzed to search for synchronization with the cells of the ATM flow and to identify the part of the timeslots allotted to the ATM flow. This analysis comprises a synchronization test executed successively on subsets of timeslots within the frames until the test indicates good synchronization, whereby the subset on which the test indicates good synchronization is identified as constituting said part allotted to the ATM flow. The ATM cells extracted from the timeslots of the identified part are directed to the second unit and the data of the timeslots situated outside the identified part are directed to the third unit.

The automatic detection of the TSs carrying the ATM flow takes place at the same time as the synchronization with the ATM cells of the flow, and it makes it possible to do away with the operation of configuring the item of equipment which performs the analysis. It is then sufficient to allot the timeslots at the first unit transmitting the flows.

In order to minimize the average detection time, it is advantageous to execute the synchronization test successively on subsets composed of a decreasing number of timeslots within the frame. For each number of timeslots, the test can be executed successively on all the subsets of a category of subsets which are composed of this number of timeslots.

Testing a priori all the possible combinations of timeslots could lead to fairly long detection times. To avoid this, it is possible to execute the synchronization test only on subsets composed of consecutive timeslots within the frame, or on subsets composed of one or two blocks, each block itself being composed of consecutive timeslots within the frame. The first unit must then adopt a corresponding allocation strategy so that the ATM cells can be received.

Another aspect of the present invention relates to a relay for digital signals received from a remote unit along a time division multiplex link and organized in the form of successive frames each having a specified number of transmission timeslots, a part of the timeslots being allotted to an ATM flow intended for a second unit while other timeslots are allotted to the transport of at least one non-ATM flow intended for a third unit. The relay comprises means for analyzing the digital signals received in successive frames to search for synchronization with cells of the ATM flow and to identify the part of the timeslots allotted to the ATM flow, and routing means for directing the ATM cells extracted from the timeslots of the identified part to the second unit and for directing the data of the timeslots situated outside the identified part to the third unit. The analysis means comprise means for executing a synchronization test successively on subsets of timeslots within frames until the test indicates good synchronization, whereby the subset on which the test indicates good synchronization is identified as constituting said part allotted to the ATM flow.

BRIEF DESCRIPTION OF THE DRAWINGS

FIG. 2 is a chart illustrating examples of digital signals transmitted on a TDM link and of ATM flows extracted from these signals.

FIGS. 4 and 5 are a chart and a flow chart similar to those of FIGS. 2 and 3 in another embodiment of the invention.

DESCRIPTION OF PREFERRED EMBODIMENTS

Figure 1:
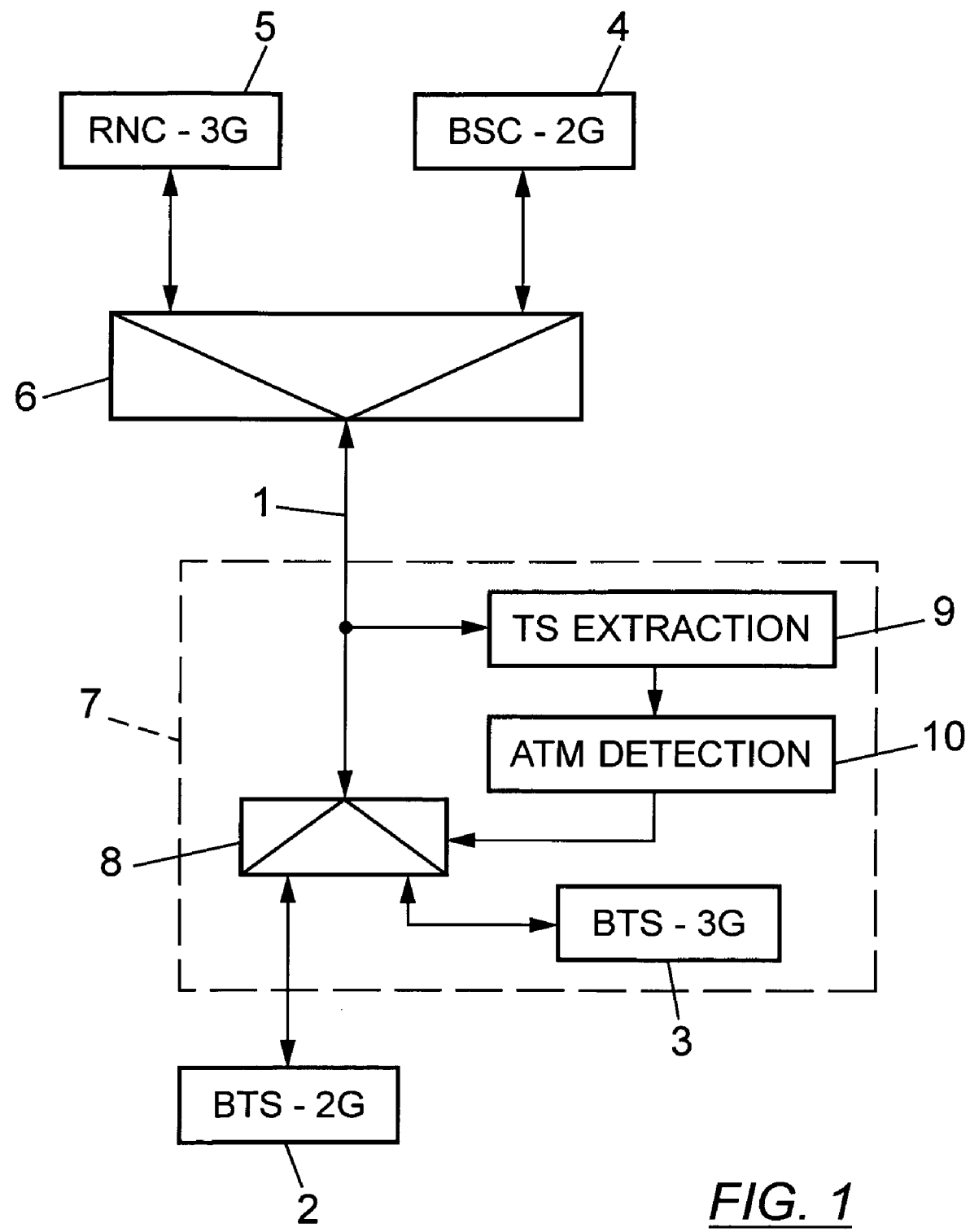
FIG. 1 is a schematic diagram of a radio access network implementing the present invention.

FIG. 1 shows a transmission line 1 carrying TDM links for transferring data between radio communication base stations 2, 3 and base station controllers 4, 5.

The base station 2 (BTS, "Base Transceiver Station") belongs to a second-generation cellular network of GSM type. Corresponding thereto is a base station controller 4 (BSC "Base Station Controller") with which it exchanges information on 64-kbit/s DS0 channels, some of them being split into four 16-kbit/s subchannels. In each direction of communication, these DS0 channels are time-division multiplexed over a TDM link of the line 1.

The BTS 3 belongs to a third-generation cellular network of the UMTS type. Corresponding thereto is a radio network controller 5 (RNC "Radio Network Controller"), with which it exchanges data in the form of ATM cells. These ATM cells are carried by the same TDM link, on which they occupy a certain number of timeslots.

In the downlink direction, from the controllers 4, 5 to the BTSs 2, 3, the ATM cells are incorporated into the TDM signals by a multiplexing unit 6. This unit 6 transposes the DS0 flows received from the BSC 4 onto respective DS0 flows of the TDM downlink formed on the line 1. Moreover, it allots a certain number of other timeslots to the ATM flow emanating from the RNC 5. It transposes the bytes of the ATM cells onto these timeslots in the manner described in the above-mentioned recommendation AF-PHY-0130.00.

The TDM link emanating from the multiplexing unit 6 is connected to a remote item of equipment 7 which, in the example considered in FIG. 1, incorporates the third-generation BTS 3. This item of equipment 7 further comprises a TDM interface which serves as a relay between the line 1 on the one hand and the BSTs 2 and 3 on the other hand.

This TDM interface comprises a demultiplexing unit 8 which transfers to the BTS 2 the DS0 channels which are intended for it. This transfer is performed on another TDM link of the same time, without modifying the position of the TSs. The demultiplexing unit 8 also recovers the ATM cells from the other DS0 channels so as to supply them to the BTS 3.

In the uplink direction, the unit 8 serves to multiplex the data flows emanating from the BTSs 2 and 3. It transposes the DS0 channels received from the BTS 2 onto corresponding channels of another TDM link provided in the reverse direction on the line 1. It also ensures the insertion of the ATM cells emanating from the BTS 3 into timeslots of the TDM frames on this uplink. The corresponding demultiplexing operations are carried out by the unit 6 which distributes the signals between the BSC 4 and the RNC 5.

The allocating of certain of the DS0 channels to the transport of the ATM cells is defined by configuring the line at the unit 6. No corresponding configuration operation is carried out at the unit 8. The latter is associated with modules 9, 10 for analyzing the digital signals received on the TDM downlink to detect what allocation is defined at the unit 6. This allocation is indicated to the demultiplexing unit 8 to allow it to extract the ATM cells to be supplied to the BTS 3. In the reverse direction, the unit 8 adopts the same allocation of DS0 channels, which is therefore known to the unit 6 for the demultiplexing.

The analysis modules 9, 10 simultaneously perform the identification of the TSs of the multiplex which are allotted to the ATM transport and the synchronization with the transported ATM cells.

The identification of the TSs carrying the ATM cells is typically carried out while setting up the item of equipment 7 which incorporates the third-generation BTS. In a typical deployment scenario, the TDM line 1 pre-exists between the second-generation items of equipment 2, 4 for transporting the GSM traffic. The items of equipment 5, 6, 7 are added in the course of the deployment of the third-generation network.

Before the first ATM cells are detected, the unit 8 transfers in a transparent manner the entire set of E1 or DS1 signals between the unit 6 and the BTS 2. When the ATM cells begin to flow, the modules 9, 10 seek to perform synchronization. As long as this synchronization has not been carried out, the entire set of DS1 or E1 signals continues to be transferred to the BTS 2. Once this synchronization has been obtained, the unit 8 is instructed accordingly so as to direct the ATM cells in the manner indicated previously.

This method allows "plug & play" set-up of the third-generation item of equipment 7 incorporating the BTS 3.

ATM synchronization is searched for by the module 10 on byte streams extracted from the TDM timeslots by the module 9. This module 9 successively tries subsets of timeslots within the TDM frames, and supplies the byte streams thus extracted to the synchronization detection module 10.

The detection of synchronization by the module 10 is performed conventionally by seeking to pinpoint the CRC bytes of the ATM headers.

The byte situated in fifth position in the header of an ATM cell is the remainder after dividing, in the Galois field of order 2, the polynomial $P(X)=X^{16} \cdot (a_0 \cdot X^0 + a_1 \cdot X^1 + \ldots + a_{31} \cdot X^{31})$, where the $a_i$ ($0 \leq i < 32$) are the bits of the first four bytes of the header, by the generating polynomial $G(X)=X^8+X^2+X+1$. This detection of the cell boundaries is specified in section 7 of recommendation I.432.1 "B-ISDN User-Network Interface—Physical Layer Specification: General Characteristics". The synchronization test uses a detection automaton having three states PRESYNC, SYNCH and HUNT:

in the HUNT state, the detection of a correct CRC byte causes the automaton to switch to the PRESYNC state;

in the PRESYNC state, the detection of an incorrect CRC byte at the expected location causes the automaton to switch back to the HUNT state;

in the PRESYNC state, the detection of δ consecutive correct CRC bytes at the expected locations causes the automaton to switch to the SYNCH state;

in the SYNCH state, the detection of α consecutive incorrect CRC bytes causes the automaton to switch to the HUNT state.

Synchronization is achieved when the automaton is in the SYNCH state. By way of example, it is possible to take α=7 and δ=8, this ensuring very reliable detection over a flow portion extracted over a maximum duration corresponding to 12 ATM cells.

To limit the number of subsets to be tried by the extraction module 9, it is possible to adopt at the unit 6 an allocation strategy such that the part of the frame allotted to the downlink ATM flow is composed of consecutive timeslots, as is represented by the hatched portions in the upper chart of FIG. 2. In this case, the module 9 may test only subsets composed of consecutive timeslots within the TDM frame.

The a priori unknown parameters are then the number N of consecutive TSs of the frame which are allocated to the ATM flow, and the position p of the first of these TSs in the frame. If L denotes the total number of TSs which can be allotted to user traffic on the TDM link (L=24 for a DS1 link, L=30 for an E1 link), then we have Nmin≦N≦L and 0≦p≦L−N, where Nmin is a minimum number of TSs which may be equal to 1.

The synchronization test is advantageously executed on subsets composed of a decreasing number N of timeslots in the frame. In the previous case (allocation of TSs as a block in the frame), the analysis procedure applied by the modules 9, 10 may be in accordance with the flow chart of FIG. 3.

The analysis is initialized in step 15 by taking N=L. For each value of N, the first position p=0 is firstly selected in step 16. The N consecutive bytes of each TDM frame starting from the position p are supplied by the module 9 to the detection module 10 over a maximum duration corresponding to 12 ATM cells (i.e. 79.5/N ms).

If the detection automaton of the module 10 detects ATM synchronization in these signals (step 17), the values of the numbers p and N are stored in memory in step 18 and supplied to the unit 8 so that it operates the demultiplexing and the multiplexing of the data accordingly. In the absence of synchronization after the maximum duration of 79.5/N ms, the module 9 determines in step 19 whether all the positions p have been tested for the length N, i.e. whether p+N=L. If positions still remain to be tested (p+N<L), the index p is incremented in step 20, and a new search for ATM synchronization is performed by the module 10 in step 17.

When p+n=L in test 19, the module 9 determines in step 21 whether the minimum number of TSs Nmin has been reached. If N>Nmin, the length N is decremented by one unit in step 22 before returning to step 16. Otherwise, the complete search for ATM synchronization has failed (perhaps because the transfer of the ATM cells on the line 1 has not yet begun), so that the module 9 returns to the initial step 15.

In the alternative embodiment illustrated in FIG. 4, a larger number of schemes for allocating the TSs to the ATM flow is allowed for. The TSs thus allotted within a TDM frame are grouped together either as a block composed of consecutive timeslots (as in FIG. 2), or as two separate blocks each composed of consecutive timeslots (as in FIG. 4). This gives greater flexibility of configuration, at the cost of an increase in the number of subsets which have to be tested by the extraction module 9. The procedure of FIG. 3 can then be supplemented with the steps represented in FIG. 5, executed after the test 19 when p+N<L.

In this modified procedure, N still denotes the total number of TSs of the TDM frame which are allotted to the ATM flow. The algorithm again proceeds by progressively decreasing the number N (outer loop of FIG. 3) and by testing the various possible combinations for each value of N. The index p again denotes the position in the frame of the first TS allotted to the TDM flow. The number M denotes the size of the first block in terms of number of bytes when the allocation to the TDM flow is in two separate blocks. The second block, of size N−M, is positioned by an index q.

Figure 3:
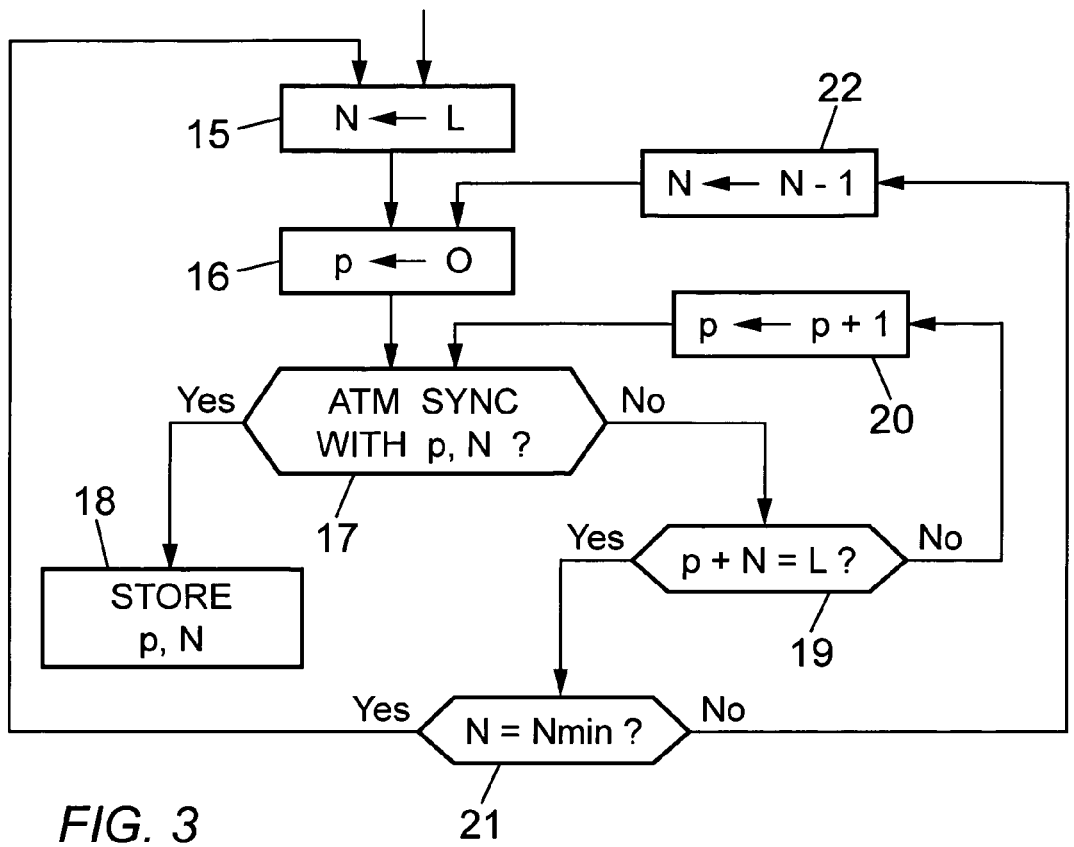
FIG. 3 is a flow chart of an analysis performed in an embodiment of the invention.
Figure 5:
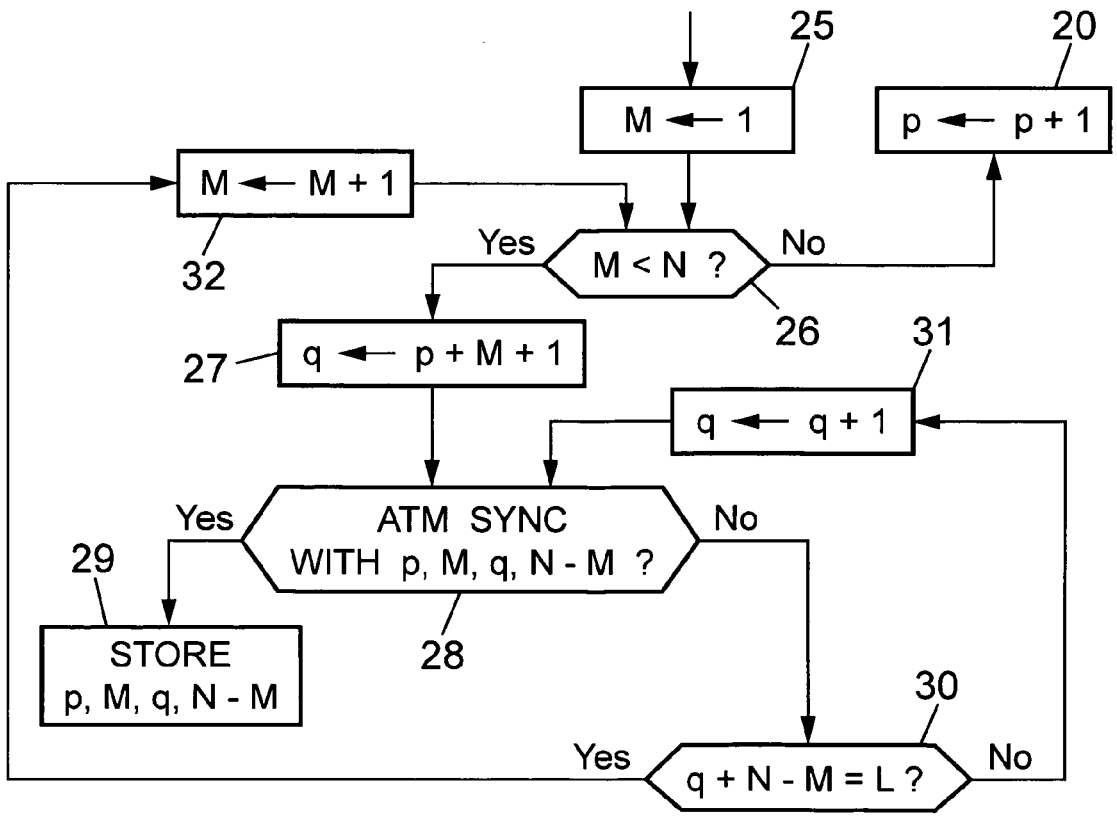

When p+N<L in test 19 of FIG. 3, the size M of the first block is initialized to 1 in step 25 of FIG. 5. The numbers M and N are then compared in step 26, and if M=N the algorithm returns to step 20 previously described where the index p is incremented by one unit. If M<N in test 26, a search loop is initialized in step 27 by placing the second block at the position q=p+M+1. In each iteration of this loop, the signal extracted by the module 9 over a maximum duration of 12 ATM cells with the parameters p, M, q, N−M is supplied to the synchronization search module 10.

If synchronization succeeds (test 28), these parameters p, M, q, N−M are stored in memory in step 29 and applied to instruct the unit 8. When synchronization fails after the duration of 12 cells, the module 9 determines in step 30 whether the last position of the second block has been tested, i.e. whether q+N−M=L. If q+N−M<L, the index q is incremented by one unit in step 31 before proceeding to the next search for synchronization 28. When all the positions of the second block of size N−M have been tested (q+N−M=L in step 30), the size M of the first block is incremented by one unit in step 32 before being compared again with the number N in step 26.

The search scheme described above makes it possible to pinpoint the ATM cells with a zero probability of false selection. Specifically, given that the number of bytes of an ATM cell (53) is a prime number greater than the maximum number L of TSs per TDM frame, it can be deduced that the numbers N and 53 are mutually prime, so that the detection of synchronization with the value N ensures that synchronization is not performed by detecting a sub-periodicity of the cells in the ATM flow.

In the case of a link of type E1 (L=30), the scheme described with reference to FIG. 5 gives rise to detection times as indicated in Table 1. It may be seen that these detection times are compatible with a "plug & play" insertion of the third-generation equipment.

TABLE 1

| N | Detection time |
|---|---|
| 30 | 2.65 ms |
| 25 | 114 ms |
| 20 | 481 ms |
| 15 | 1.356 s |
| 10 | 3.505 s |
| 5 | 10.74 s |
| 1 | 71.55 s |

The invention claimed is:

1. A method of communicating along a time division multiplex link on which digital signals are exchanged in the form of successive frames each having a specified number of transmission timeslots, wherein a first unit inserts ATM cells into a part of the timeslots allotted to an ATM flow intended for a second unit, and other data into other timeslots allotted to the transport of at least one non-ATM flow intended for a third unit, the method comprising the steps of:

analyzing digital signals received in successive frames to search for synchronization with the cells of the ATM flow and to identify the part of the timeslots allotted to the ATM flow, the analysis comprising a synchronization test executed successively on subsets of timeslots within the frames until the test indicates good synchronization, whereby the subset on which the test indicates good synchronization is identified as constituting said part allotted to the ATM flow;

directing the ATM cells extracted from the timeslots of the identified part to the second unit; and directing the data of the timeslots situated outside the identified part to the third unit.

2. A method according to claim 1, wherein the analysis of the digital signals is performed in an item of equipment incorporating the second unit.

3. A method according to claim 1, further comprising the step of directing all the frames to the third unit before the part of the timeslots allotted to the ATM flow has been identified.

4. A method according to claim 1, wherein the data received in each timeslot of the frame situated outside the part allotted to the ATM flow are directed to the third unit along another time division multiplex link having an identical frame structure, and are placed in a corresponding timeslot of the frame on said other time division multiplex link.

5. A method according to claim 1, wherein another time division multiplex link having an identical frame structure is provided for flow transmission in the reverse direction towards the first unit, and wherein another ATM flow placed in timeslots corresponding to those of said part allotted to the ATM flow is transmitted on said other link.

6. A method according to claim 1, wherein the synchronization test is executed successively on subsets composed of a decreasing number of timeslots within the frame.

7. A method according to claim 6, wherein for each number of timeslots, the synchronization test is executed successively on all the subsets of a category of subsets composed of said number of timeslots.

8. A method according to claim 1, wherein the synchronization test is executed on subsets composed of consecutive timeslots within the frame.

9. A method according to claim 1, wherein the synchronization test is executed on subsets composed of one or two blocks, each block being composed of consecutive timeslots within the frame.

10. A relay for digital signals received from a remote unit along a time division multiplex link and organized in the form of successive frames each having a specified number of transmission timeslots, a part of the timeslots being allotted to an ATM flow intended for a second unit while other timeslots are allotted to the transport of at least one non-ATM flow intended for a third unit, the relay comprising means for analyzing the digital signals received in successive frames to search for synchronization with cells of the ATM flow and to identify the part of the timeslots allotted to the ATM flow, and routing means for directing the ATM cells extracted from the timeslots of the identified part to the second unit and for directing the data of the timeslots situated outside the identified part to the third unit, wherein the analysis means comprise means for executing a synchronization test successively on subsets of timeslots within frames until the test indicates good synchronization, whereby the subset on which the test indicates good synchronization is identified as constituting said part allotted to the ATM flow.

11. A relay according to claim 10, wherein the routing means are arranged to direct the entire set of frames to the third unit before the part of the timeslots allotted to the ATM flow has been identified by the analysis means.

12. A relay according to claim 10, wherein the routing means are arranged to direct the data received in each timeslot of the frame situated outside the part allotted to the ATM flow to the third unit along another time division multiplex link having an identical frame structure, by placing said data in a corresponding timeslot of the frame on said other time division multiplex link.

13. A relay according to claim 10, comprising means of flow transmission in the reverse direction towards the first unit, on another time division multiplex link having an identical frame structure, the means of transmission being controlled to transmit on said other link another ATM flow placed in timeslots corresponding to those of said part allotted to the ATM flow.

14. A relay according to claim 10, wherein the means for executing the synchronization test are arranged to execute said test successively on subsets composed of a decreasing number of timeslots within the frame.

15. A relay according to claim 14, wherein the means for executing the synchronization test are arranged to execute said test successively, for each number of timeslots, on all the subsets of a category of subsets composed of said number of timeslots.

16. A relay according to claim 10, wherein the means for executing the synchronization test are arranged to execute said test on subsets composed of consecutive timeslots within the frame.

17. A relay according to claim 10, wherein the means for executing the synchronization test are arranged to execute said test on subsets composed of one or two blocks, each block being composed of consecutive timeslots within the frame.

* * * * *